(12) United States Patent
Han et al.

(10) Patent No.: US 11,904,807 B2
(45) Date of Patent: Feb. 20, 2024

(54) TECHNIQUES TO DETECT THEFT OF GOODS IN VEHICLES

(71) Applicant: TUSIMPLE, INC., San Diego, CA (US)

(72) Inventors: Charles Seunghwan Han, San Diego, CA (US); Arda Kurt, San Diego, CA (US); Xiaoling Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 775 days.

(21) Appl. No.: 17/016,145

(22) Filed: Sep. 9, 2020

(65) Prior Publication Data

US 2022/0073030 A1    Mar. 10, 2022

(51) Int. Cl.
| | |
|---|---|
| *B60R 25/10* | (2013.01) |
| *G01F 22/00* | (2006.01) |
| *G01G 19/08* | (2006.01) |
| *G01L 5/00* | (2006.01) |
| *B60R 25/34* | (2013.01) |
| *G01P 15/08* | (2006.01) |

(52) U.S. Cl.
CPC .......... *B60R 25/1004* (2013.01); *B60R 25/34* (2013.01); *G01F 22/00* (2013.01); *G01G 19/08* (2013.01); *G01L 5/00* (2013.01); *G01P 15/08* (2013.01)

(58) Field of Classification Search
CPC ..... B60R 25/1004; B60R 25/34; B60R 25/10; B60R 25/102; B60R 25/30; B60R 25/307; B60R 2025/1013; G01F 22/00; G01G 19/08; G01G 19/4142; G01L 5/00; G01P 15/08

USPC .......................................................... 701/45
See application file for complete search history.

(56) References Cited

U.S. PATENT DOCUMENTS

| | | | |
|---|---|---|---|
| 10,717,411 B1* | 7/2020 | Diehl | ....................... G01L 5/243 |
| 2021/0024036 A1* | 1/2021 | Diehl | .................... B60R 25/102 |
| 2021/0035442 A1* | 2/2021 | Baig | .................... G08G 1/0112 |

FOREIGN PATENT DOCUMENTS

| | | | | |
|---|---|---|---|---|
| CN | 105329206 A | | 2/2016 | |
| CN | 114228662 A | * | 3/2022 | ......... B60R 25/1004 |

* cited by examiner

*Primary Examiner* — Tyler D Paige
(74) *Attorney, Agent, or Firm* — Perkins Coie LLP; Paul Liu (57) ABSTRACT

Techniques are described for determining an occurrence of theft in a vehicle. An example processor implemented method comprises receiving, by a computer located in an autonomous vehicle and at a first time, a first torque value that indicates a first amount of torque applied by an engine of the autonomous vehicle to drive the autonomous vehicle, receiving, at a second time that is later in time than the first time, a second torque value that indicates a second amount of torque applied by the engine of the autonomous vehicle, determining that a difference between a first value and a second value is greater than a pre-determined value, where the first value and the second value are functions of at least the first torque value and at least the second value respectively, and displaying, in response to the determining, a message that indicates a theft detection in the autonomous vehicle.

19 Claims, 3 Drawing Sheets

TECHNIQUES TO DETECT THEFT OF GOODS IN VEHICLES

TECHNICAL FIELD

This document relates to systems, apparatus, and methods to detect theft of goods in a vehicle, such as an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself. In some other cases, an autonomous vehicle may be driven without a driver to a destination. Autonomous vehicles may include an autonomous semi-trailer truck that may carry goods to a destination.

SUMMARY

Autonomous vehicles or other types of vehicles carrying goods may be subject to theft. Systems, apparatus, and methods are provided to determine weight of a vehicle, including autonomous vehicle, as the vehicle is operated on a road. An in-vehicle control computer located in a vehicle can detect theft upon determining that the weight of the vehicle has changed. When a theft is detected, the in-vehicle control computer can also send messages to law enforcement or other persons (e.g., driver or a control center located outside the vehicle).

In an example embodiment, a processor implemented method comprises, receiving, by a computer located in an autonomous vehicle and at a first time, a first torque value that indicates a first amount of torque applied by an engine of the autonomous vehicle to drive the autonomous vehicle; receiving, at a second time that is later in time than the first time, a second torque value that indicates a second amount of torque applied by the engine of the autonomous vehicle; determining that a difference between a first value and a second value is greater than a pre-determined value, wherein the first value is a function of at least the first torque value and the second value is a function of at least the second torque value; and displaying, on an interface associated with the computer and in response to the determining, a message that indicates a detection of theft in the autonomous vehicle.

In some embodiments, the first value comprises a first weight of goods included in the autonomous vehicle, the second value comprises a second weight of goods included in the autonomous vehicle, and the first value and the second value are determined by: estimating the first weight of goods included in the autonomous vehicle based at least on a first drive force, a first acceleration value, and a first pitch angle of the autonomous vehicle; and estimating a second weight of goods included in the autonomous vehicle based at least on a second drive force, a second acceleration value, and a second pitch angle of the autonomous vehicle at the second time. In some embodiments, the first drive force is determined as a first function of at least the first torque value, the second drive force is determined as a second function of at least the second torque value, the first weight is estimated by subtracting a previously known weight of the autonomous vehicle without the goods from a first result obtained by dividing the first drive force by a third function comprising the first acceleration value, gravity, and the first pitch angle, and the second weight is estimated by subtracting the previously known weight of the autonomous vehicle without the goods from a second result obtained by dividing the second drive force by a fourth function comprising the second acceleration value, gravity, and the second pitch angle.

In some embodiments, the first drive force is determined as a first function of at least the first torque value, the second drive force is determined as a second function of at least the second torque value, the first weight is estimated by subtracting a previously known weight of a container that comprises the goods from a first result obtained by dividing the first drive force by a third function comprising the first acceleration value, gravity, and the first pitch angle, and the second weight is estimated by subtracting the previously known weight of the container that comprises the goods from a second result obtained by dividing the second drive force by a fourth function comprising the second acceleration value, gravity, and the second pitch angle. In some embodiments, the first weight is estimated by subtracting a total weight of one or more persons located in the autonomous vehicle from a first result obtained by dividing the first drive force by a third function comprising the first acceleration value, gravity, and the first pitch angle, the second weight is estimated by subtracting the total weight of the one or more persons located in the autonomous vehicle from a second result obtained by dividing the second drive force by a fourth function comprising the second acceleration value, gravity, and the second pitch angle, and the total weight is determined using one or more weight values obtained from one or more weight sensors located in one or more seats of the autonomous vehicle.

In some embodiments, the first drive force is determined as the first function of the first torque value, a pre-defined transmission gear ratio, a pre-defined final drive ratio, a transmission efficiency, and a tire radius, and the second drive force is determined as the second function of the second torque value, the pre-defined transmission gear ratio, the pre-defined final drive ratio, the transmission efficiency, and the tire radius. In some embodiments, the first drive force is determined as a first function of at least the first torque value, the second drive force is determined as a second function of at least the second torque value, the first weight is estimated by subtracting a first weight of a fuel in the autonomous vehicle from a first result obtained by dividing the first drive force by a third function comprising the first acceleration value, gravity, and the first pitch angle, and the second weight is estimated by subtracting a second weight of the fuel in the autonomous vehicle from a second result obtained by dividing the second drive force by a fourth function comprising the second acceleration value, gravity, and the second pitch angle.

In some embodiments, the first weight and the second weight of the fuel are determined by multiplying a previously known density of the fuel by a first volume of the fuel and the second volume, respectively, and the first volume and the second volume of the fuel are determined by a fuel gauge sensor. In some embodiments, the first acceleration value, the second acceleration value, the first pitch angle, and the second pitch angle are obtained from an inertial measurement unit (IMU), and the first pitch angle and the second pitch angle describe angles by which the autonomous vehicle is pointing up or down relative to a horizon.

In some embodiments, the method further comprises sending the message to a remote computer located in a command center outside the autonomous vehicle in response to the determination that the difference between the first value and the second value is greater than the pre-determined value. In some embodiments, the method further comprises sending a second message to another computer located outside the autonomous vehicle and associated with a law enforcement agency, the second message is sent in response to the determination that the difference between the first value and the second value is greater than the pre-determined value, the second message indicates that theft is detected in the autonomous vehicle, and the second message comprises a location of the autonomous vehicle and a license plate number of the autonomous vehicle.

In some embodiments, the method further comprises causing the autonomous vehicle to be brought to a stop or to be parked in response to the detection of the theft and in response to determining that the autonomous vehicle is driven on a road. In some embodiments, the method further comprises receiving, at a third time, a first set of weight values that indicate a weight of the goods; receiving, at a fourth time that is later in time than the third time, a second set of weight values that indicate the weight of the goods, wherein the first set of weight values and the second set of weight values are received from a set of weight sensors located in the autonomous vehicle; and displaying, on the interface associated with the computer, a second message that indicates that theft is detected in response to determining that a first value representative of the first set of weight values differs from a second value representative of the second set of weight values by the pre-determined value.

In some embodiments, the first value is an average of the first set of weight values, and wherein the second value is an average of the second set of weight values. In some embodiments, a first time difference between the first time and the second time is based on a first pre-determined time period, a second time difference between the third time and the fourth time is based on a second pre-determined time period, and the first pre-determined time period is greater than the second pre-determined time period. In some embodiments, the first set of weight values and the second set of weight values are received by polling the set of weight sensors upon receiving from a proximity sensor located in the rear region of the autonomous vehicle an indication that indicates a presence of an object in a rear region of the autonomous vehicle and upon determining that: (1) the speed of the autonomous vehicle is less than the pre-determined speed value, or (2) the autonomous vehicle is parked, or (3) the autonomous vehicle is stopped. In some embodiments, the first set of weight values and the second set of weight values are received by polling the set of weight sensors upon receiving from an inertial measurement unit (IMU) device located in the autonomous vehicle an indication that indicates that a jolt is detected and upon determining that: (1) the speed of the autonomous vehicle is less than the pre-determined speed value, or (2) the autonomous vehicle is parked, or (3) the autonomous vehicle is stopped.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed. In yet another exemplary embodiment, a system includes a computer with a processor that is configured or operable to perform the above-described methods is disclosed.

The above and other aspects and their implementations are described in greater detail in the drawings, the descriptions, and the claims.

DETAILED DESCRIPTION

Developments in autonomous driving technology have led to a development of semi-trailer truck that can be autonomously driven to deliver goods to a destination. When a semi-trailer truck is driven to its destination, the semi-trailer truck can experience different driving conditions such as uphill driving, downhill driving, or windy conditions. Through the various driving conditions, the autonomous semi-trailer truck is expected to carry goods from a starting location to a destination by performing safe driving operations and by protecting the goods to avoid theft. The techniques described in this patent document can be used to determine weight of the autonomous semi-trailer truck through the various driving conditions. In an example embodiment, the techniques described herein can allow an in-vehicle control computer located in the autonomous semi-trailer truck to determine in real-time a weight of the autonomous semi-trailer truck and/or the goods therein as the autonomous semi-trailer truck is driven to its destination.

Section I of this patent document provides an overview of the devices/systems located on or in an autonomous vehicle, such as an autonomous semi-trailer truck. Section II of this patent document describes techniques to determine weight of the semi-trailer truck and/or the goods therein as the semi-trailer truck is operated. The example headings for the various sections below are used to facilitate the understanding of the disclosed subject matter and do not limit the scope of the claimed subject matter in any way. Accordingly, one or more features of one example section can be combined with one or more features of another example section.

I. Autonomous Driving Ecosystem

Figure 1:
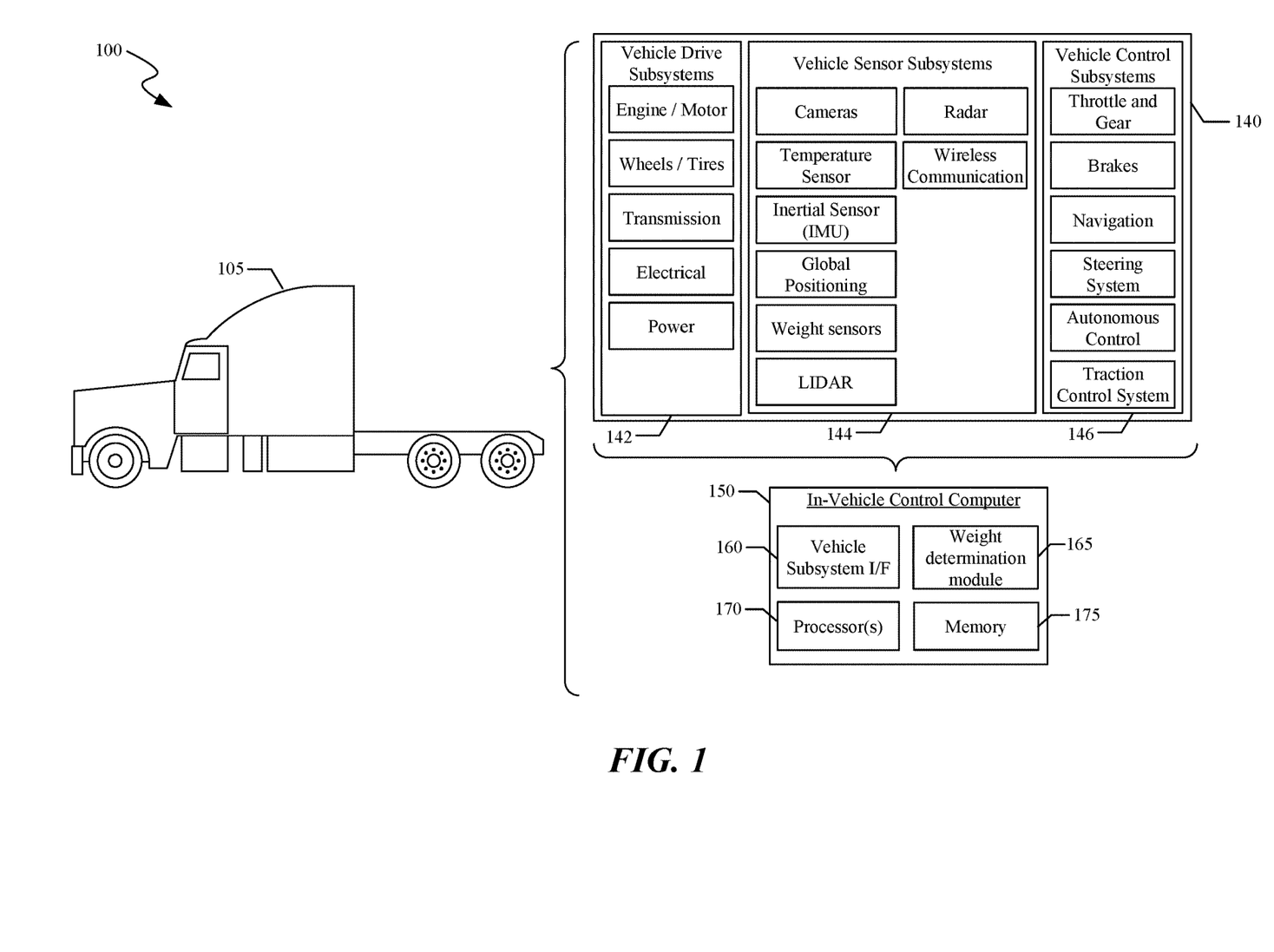
FIG. 1 shows a block diagram of an example vehicle ecosystem in which an in-vehicle control computer located in the vehicle can determine a weight of the vehicle or the goods in the vehicle.

FIG. 1 shows a block diagram of an example vehicle ecosystem 100 in which an in-vehicle control computer 150 located in the vehicle 105 can determine a weight of the vehicle 105 and/or the goods in the vehicle 105. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed without affecting the weight determination related features described in this patent document. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. As explained in Section II, the engine or motor may provide to the weight determination module 165 via a CAN bus information about torque applied by the engine so that the weight determination module 165 can determine weight of the container and/or goods therein.

The vehicle sensor subsystem 144 may include a number of sensors configured to sense information about an environment in which the vehicle 105 is operating or a condition of the vehicle 105. As further explained in this patent document, the weight determination module 165 in the in-vehicle control computer 150 can determine the weight of the vehicle 105 and/or the weight of the goods in the vehicle 105 based on information provided by sensors (e.g., weight sensors) in the vehicle sensor subsystem 144. In some embodiments, the weight sensors may be located on multiple axles to measure the weight applied on each axle. In some embodiment, a single weight sensor can be located on a trailer portion of the autonomous semi-trailer truck so that when a container (that includes goods) is placed on the trailer, the weight sensor can determine the weight of the container. The vehicle sensor subsystem 144 may include one or more cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 144 may also include sensors configured to monitor internal systems of the vehicle 105 (e.g., an 02 monitor, a fuel gauge, an engine oil temperature, etc.,). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the vehicle 105 based on inertial acceleration. As further described in Section II, the IMU may provide to the weight determination module 165 a pitch angle of the vehicle 105 (or an angle that describes by how much the vehicle 105 is pointing in an uphill or downhill direction) and a linear acceleration so that the weight distribution module 165 can use this information along with the information about the torque applied by the engine to estimate a weight of the vehicle 105 and/or the weight of the goods therein. The GPS transceiver may be any sensor configured to estimate a geographic location of the vehicle 105. For this purpose, the GPS transceiver may include a receiver/transmitter operable to provide to the weight determination module 165 information regarding the position and altitude of the vehicle 105 with respect to the Earth. The RADAR unit may represent a system that utilizes radio signals to sense objects within the environment in which the vehicle 105 is operating. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include one or more cameras configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the processor 170 to perform various methods and/or functions of the vehicle 105, including those described for the weight determination module 165 as explained in this patent document. For instance, the processor 170 executes the operations associated with weight determination module 165 for determining the weight of container and/or goods and/or the vehicle 105 as further described in Section II.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Determining Weight of the Autonomous Vehicle and/or the Goods Carried Therein II.(a). Weight Determinations Based on Torque and Driving Conditions A weight of the vehicle 105 and/or the goods in the vehicle 105 may be estimated based on a torque applied to the vehicle 105 to move the vehicle. The vehicle 105 may include a tractor unit which includes a driver's cab and a trailer unit that may carry a container that includes goods. In each of the weight determination (or weight estimation) techniques described in this patent, the weight of the goods or container or vehicle 105 is determined by the weight determination module 165 at one point in time and then compared to the weight of the goods or container or vehicle 105 determined by the weight determination module 165 at another point in time to determine whether theft has occurred by determining whether a change in the weight of the goods has occurred. Thus, the weight determination techniques described in this patent document provide an estimate of the weight of the goods or container or vehicle 105 to determine whether a change in estimated weight is detected.

In an example scenario, when a vehicle 105 is stopped on a road, the velocity and acceleration are approximately zero, when a torque is applied to the vehicle 105, the velocity and acceleration increases as the vehicle is driven along the road. When a constant torque is applied to the vehicle 105, the velocity may steadily increase and the acceleration may decrease to approximately zero. The weight determination module 165 can obtain from the engine in the vehicle 105 torque values via a CAN bus.

Figure 2:
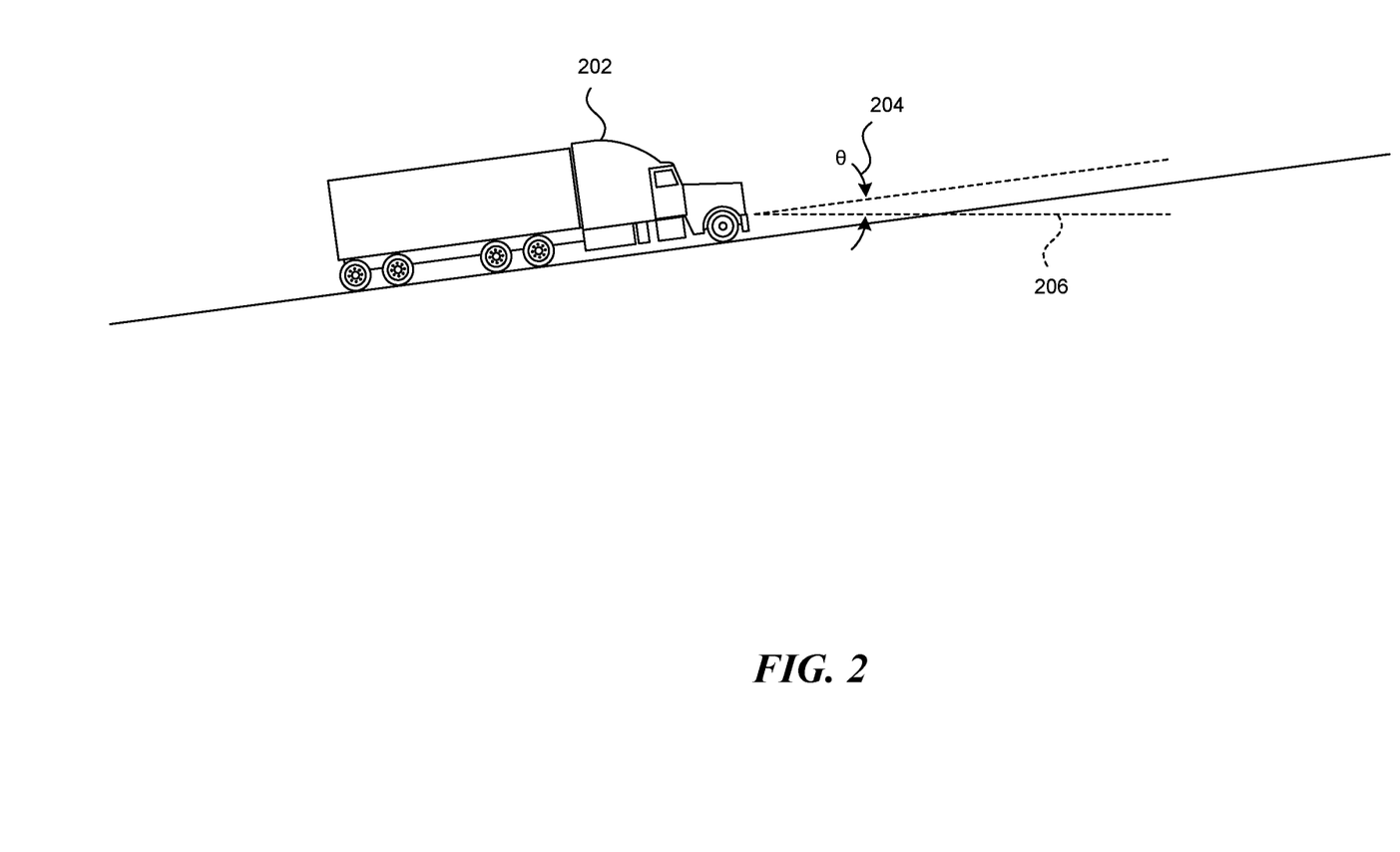
FIG. 2 shows an example scenario where an autonomous vehicle is driving uphill on a road.

FIG. 2 shows an example scenario in which the autonomous vehicle 202 is driving uphill on a road. In the example scenario of FIG. 2, the weight determination module 165 in the in-vehicle control computer of the autonomous vehicle 202 may estimate the weight of the autonomous vehicle 202 and/or the goods in the autonomous vehicle 202 using the Equation (1) below:

$$m = F_{drive}/(a + \text{gravity} * \sin(\theta)) \quad \text{Equation (1)}$$

where m is the mass of the vehicle, a is the linear acceleration measured by the IMU, $F_{drive}$ is a longitudinal drive force that can be determined using Equation (2) below, and a pitch angle of the vehicle 105 is denoted as θ. The pitch angle 204 is the amount of angle by which the vehicle 202 is pointing up or down (up is shown in FIG. 2) relative to the horizon 206 or a flat surface. For example, the vehicle may point 10 degrees up or −14 degrees down relative to horizon. The weight determination module 165 may receive the linear acceleration and the pitch angle from the IMU.

$$F_{drive} = T_e * R_a * R_{fdr} * \text{eff}_{trans} * (1/r_{wheel}) \quad \text{Equation (2)}$$

where $T_e$ is the engine torque measured by the engine, $R_a$ is the gear ratio, $R_{fdr}$ is the final drive $\text{eff}_{trans}$ ratio, is the transmission efficiency, and $r_{wheel}$ is the effective tire radius. The weight determination module 165 may receive a torque value $T_e$ from the engine, and values for the following variables that may be pre-defined: the gear ratio $R_a$, the final drive ratio $R_{fdr}$.

The transmission efficiency $\text{eff}_{trans}$ may be estimated by the weight determination module 165 using a look-up table stored in the in-vehicle control computer, where the look-up table provides values for transmission efficiency $\text{eff}_{trans}$ corresponding to various known loads or goods. Transmission efficiency $\text{eff}_{trans}$ of the vehicle 105 can be described as a ratio of the output power applied by the wheels to the input power of the engine. While Equations (1) and (2) may be used to estimate the weight of the goods, the weight determination module 165 may previously know the weight of the goods being transported by the vehicle 105 (e.g., the driver can enter the weight of goods information via a display and keyboard associated with the in-vehicle control computer). The weight determination module 165 can use the entered weight of the goods to obtain the transmission efficiency $\text{eff}_{trans}$.

The tire radius $r_{wheel}$ includes the physical tire radius, which can be different based on the temperature and weight of goods. In some embodiments, the tire radius can be estimated using a function that includes at least the temperature and weight of goods. The weight determination module 165 can estimate the tire radius based on a temperature measurement obtained from a temperature sensor in the vehicle 105 and based on the weight of goods known to the in-vehicle control computer. While the weight estimation techniques described in the context of the autonomous vehicle 202 driven uphill in FIG. 2, the weight estimation techniques can be applied to an autonomous vehicle on a road of any pitch angle (e.g., zero for flat road, 10 degrees, etc.,)

The weight determination module 165 can use the techniques described in this patent document to estimate weight of the goods or container carrying the goods or the vehicle 105 at different points in time. The weight determination module 165 may estimate the weight of the goods or container or vehicle 105 at a pre-determined time period (e.g., every 10 seconds) using Equations (1) and (2). In an example scenario, if the weight determination module 165 estimates a first weight of goods at a first time and then estimates a second weight of the same goods at a second time (later in time than the first time), and if the weight determination module 165 determines that the difference between the first weight and the second weight is greater than a pre-determined value (e.g., greater than 50 lbs.) or is greater than a pre-determined percentage (e.g., 0.5%) of the first weight, then the weight determination module 165 can send a message to be displayed on an interface, for example, a monitor, associated with the in-vehicle control computer 150. The message can indicate to the driver that a possible theft has occurred. In some embodiments, the weight determination module 165 can send the message indicating that possible theft has occurred to a remote computer located in a command center outside the vehicle 105.

In some embodiments, the weight of just the vehicle 105 without the container carrying the goods may be a previously known value stored on the in-vehicle control computer 150. Thus, the weight determination module 165 can determine the weight of the container carrying the goods by subtracting the previously known weight of just the vehicle 105 from the weight estimated by using the above-mentioned equations. In some embodiments, the weight of the container may also be previously known and stored in the in-vehicle control computer 150. In such embodiments, the weight determination module 165 can determine the weight of just the goods in the container by subtracting the previously known weight of just the vehicle 105 and the previously known weight of the container from the weight estimated by using the above-mentioned equations.

In some embodiments, the weight determination module 165 can also subtract from the weight estimated by using the above-mentioned equations a weight of the fuel to get as accurate an estimate of the weight of the goods. The weight of the fuel will decrease as the vehicle 105 is driven on the road. Thus, in some embodiments, the weight determination module 165 may receive from a fuel gauge sensor information that indicates a remaining volume of fuel in the fuel tank of the vehicle 105. The weight determination module 165 can determine a weight of the fuel by multiplying the previously known density of the fuel with the remaining volume of the fuel. Thus, the weight determination module 165 can determine the weight of just the goods in the container by subtracting the previously known weight of just the vehicle 105 and the previously known weight of the container and the weight of the remaining fuel from the weight estimated by using the above-mentioned equations. The weight determination module 165 may determine the weight of the fuel periodically or regularly so that the weight of the fuel can be determined at least at two different times associated with when the weight determination module 165 receives, for example, torque values from the engine.

In some embodiments, the weight determination module 165 can also subtract from the weight estimated by using the above-mentioned equations a weight of the driver or passenger in the vehicle 105. Weight sensors located in the driver's cab (e.g., in the seats) in the vehicle 105 can provide information about one or more persons sitting in the driver's cab. Thus, the weight determination module 165 can receive from the weight sensors in the driver's cab one or more measurements corresponding to one or more weights of one or more passengers in the driver's cab. Thus, the weight determination module 165 can determine the weight of just the goods in the container by subtracting the previously known weight of just the vehicle 105 and the previously known weight of the container and the weight of the remaining fuel and one or more weights of one or more passengers in the driver's cab from the weight estimated by using the above-mentioned equations.

II.(b). Weight Determinations for a Stationary Autonomous Vehicle

In some embodiments, a combination of sensors located on the vehicle 105 can be used to determine whether a theft has occurred when the vehicle 105 is parked, stationary (e.g., stopped at a stop light), or slowly moving. The weight determination module 165 can determine when the vehicle 105 is parked, stationary or slowly moving and when the vehicle 105 is driven at higher speeds. For example, when weight determination module 165 determines that the vehicle's 105 speed is less than a pre-determined value (e.g., less than 20 mph) or that the vehicle is parked (e.g., upon receiving a message from the engine/transmission indicating that the vehicle is parked), the weight determination module 165 can receive values that indicate weights measured by the weight sensors located in the vehicle (e.g., on the axles of the trailer unit or in the air-suspension system of the vehicle 105).

In some embodiments, the weight determination module 165 can receive weight measurements from multiple weight sensors that may be located on multiple axles of the trailer unit of the vehicle 105. The container carrying the goods is placed on the trailer unit of the vehicle 105. Thus, the weight determination module 165 may average the weight measurements received from the multiple weight sensors to obtain a first estimated value of a weight of the container carrying the goods at one time instance and may obtain another average of the weight measurements received from the multiple weight sensors to obtain a second estimated value of the weight of the container carrying the goods at another time instance. Using the techniques described in this patent document, the weight determination module 165 can determine that a theft has occurred upon determining that the first estimated value differs from the second estimated value by a pre-determined value.

The likelihood of a theft occurring with goods located in the vehicle 105 may be higher when the vehicle 105 is parked, stationary, or slowly moving than when the vehicle 105 is driven at higher speeds (e.g., more than 20 mph). Thus, in some embodiments, the frequency with which the weight determination module 165 obtains or estimates weight of the goods or container or vehicle 105 is higher when the vehicle 105 is parked, stationary, or slowly moving than when the vehicle 105 is driven at higher speeds on a road. For example, the weight determination module 165 may estimate the weight of the goods or container or vehicle 105 at a first pre-determined time period (e.g., every 10 seconds) when the weight determination module 105 determines that the vehicle 105 speed is more than a pre-determined value (e.g., more than mph), and the weight determination module 165 may estimate the weight of the goods or container or vehicle 105 at a second pre-determined time period (e.g., every 5 seconds) higher than the first pre-determined time period when the weight determination module 165 determines that the speed of the vehicle 105 is less than the predetermined value (e.g., less than 20 mph).

The weight determination module 165 can estimate the weight of the goods or container or vehicle 105 at a certain frequency. Thus, the weight determination module 165 can compare the estimated weight determined at a first time with the estimated weight determined at a second time later than the first time. Using the techniques described in this patent document, upon determining that there is a difference between the two estimated weights, the weight determination module 165 can send a message to an interface, for example, a monitor, associated with the in-vehicle control computer and/or to a remote computer located in a command center.

In some embodiments, additional sensors located in the vehicle 105 may trigger the weight determination module 105 to estimate the weight of the goods or container or vehicle 105 at two different time instances. For example, a proximity sensor located in a rear region of the trailer unit (e.g., on top the license plate) can determine a presence of an object (e.g., a person) and then send a message to the weight determination module 165 to indicate that the object is detected behind the trailer unit. Upon receiving the message from the proximity sensor, the weight determination module 105 can poll the weight sensors to receive weight values at a first time. After a pre-determined time period (e.g., after 5 seconds), the weight determination module 165 can poll the weight sensors to receive weight values at a second time. Using the techniques described in this patent document, upon determining that there is a difference between the two estimated weights, the weight determination module 165 can send a message to an interface, for example, a monitor, associated with the in-vehicle control computer and/or to a remote computer located in a command center.

In some embodiments, the weight determination module 165 may be triggered to poll the weight sensors to estimate weight at least two time instances upon receiving from the IMU in the vehicle 105 a message that indicates that a jolt has been detected when the vehicle 105 is parked or stationary or slowly moving. A jolt may be indicative of a forceful opening of a door of the container on the vehicle 105. Thus, for example, if the weight determination module 165 receives a message from the IMU sensor that jolt has been detected and if the weight determination module 165 determines that a speed of the vehicle 105 is less than a pre-determined value (e.g., less than 20 mph), then the weight determination module 165 can poll the weight sensors in the vehicle 105 to estimate a weight of the goods or container or vehicle 105 as described in this patent document.

In some embodiments, upon determining that a theft has occurred, the weight determination module 165 can send a message to a computer located outside the vehicle 105 associated with a law enforcement agency, where the message can indicate that a theft is detected and the message can include a location (e.g., GPS location) of the vehicle 105 and a license plate number of the vehicle 105 to assist law enforcement officers to find and identify the vehicle 105. In some embodiments, if the weight determination module 165 determines that a theft has occurred and that the vehicle 105 is driving on a road (i.e., is not parked or stationary), the weight determination module 165 can send instructions (e.g., brake instruction, navigation instruction, steering instruction) to other devices (e.g., brake, engine, steering, transmission) in the vehicle 105 to cause the vehicle 105 to pull over the road to park the vehicle 104 or to bring the vehicle 105 to a complete stop.

Figure 3:
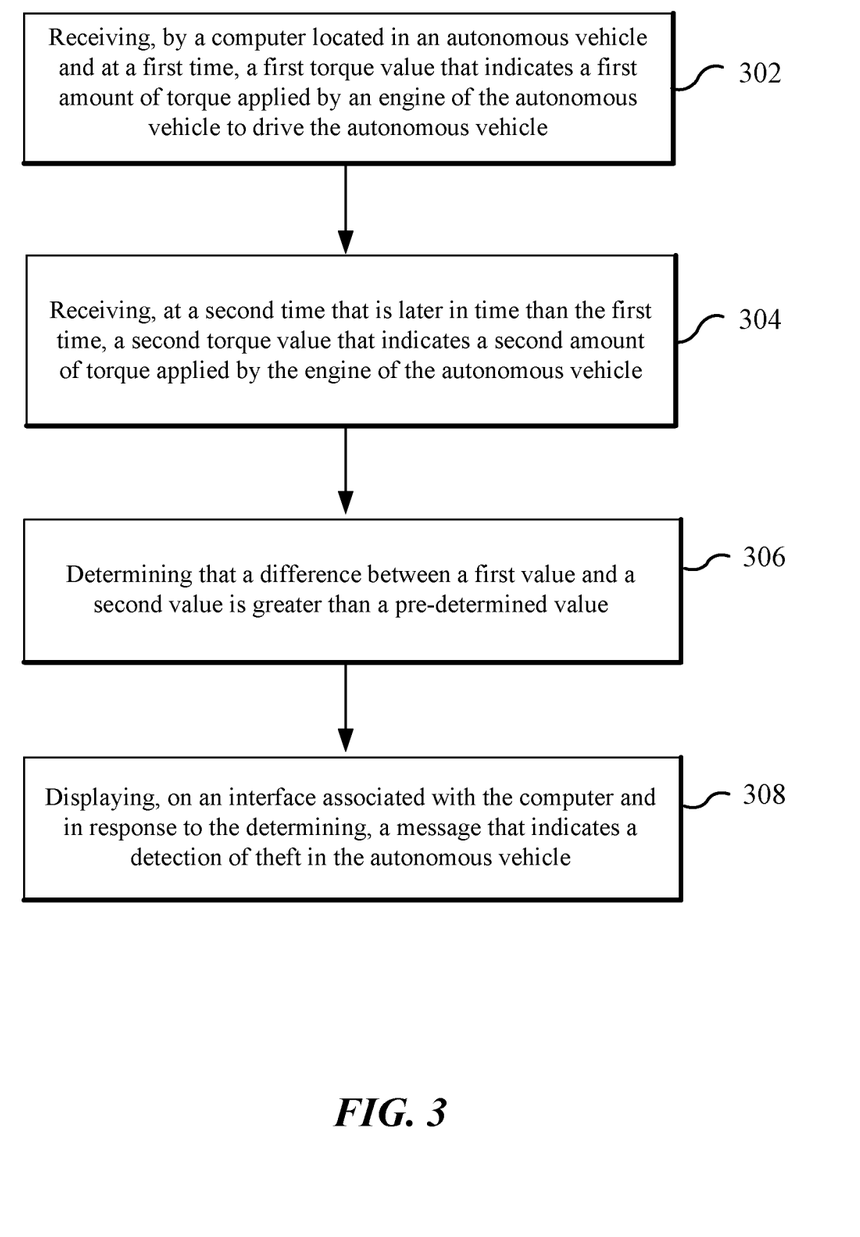
FIG. 3 shows a flow diagram for detecting occurrence of theft in an autonomous vehicle.

FIG. 3 shows a flow diagram for detecting occurrence of theft in an autonomous vehicle. Operation 302 includes receiving, by a computer located in an autonomous vehicle and at a first time, a first torque value that indicates a first amount of torque applied by an engine of the autonomous vehicle to drive the autonomous vehicle. Operation 304 includes receiving, at a second time that is later in time than the first time, a second torque value that indicates a second amount of torque applied by the engine of the autonomous vehicle. Operation 306 includes determining that a difference between a first value and a second value is greater than a pre-determined value, wherein the first value is a function of at least the first torque value and the second value is a function of at least the second torque value. Operation 308 includes displaying, on an interface associated with the computer and in response to the determining, a message that indicates a detection of theft in the autonomous vehicle.

The first value may comprise a first weight of goods included in the autonomous vehicle, the second value may comprise a second weight of goods included in the autonomous vehicle. The first value and the second value are determined by: (1) estimating the first weight of goods included in the autonomous vehicle based at least on a first drive force, a first acceleration value, and a first pitch angle of the autonomous vehicle; and (2) estimating a second weight of goods included in the autonomous vehicle based at least on a second drive force, a second acceleration value, and a second pitch angle of the autonomous vehicle at the second time.

The first drive force may be determined as a first function of at least the first torque value, and the second drive force is determined as a second function of at least the second torque value. The first weight may be estimated by subtracting a previously known weight of the autonomous vehicle without the goods from a first result obtained by dividing the first drive force by a third function comprising the first acceleration value, gravity, and the first pitch angle. The second weight may be estimated by subtracting the previously known weight of the autonomous vehicle without the goods from a second result obtained by dividing the second drive force by a fourth function comprising the second acceleration value, gravity, and the second pitch angle.

The first drive force may be determined as a first function of at least the first torque value. The second drive force may be determined as a second function of at least the second torque value. The first weight may be estimated by subtracting a previously known weight of a container that comprises the goods from a first result obtained by dividing the first drive force by a third function comprising the first acceleration value, gravity, and the first pitch angle. The second weight may be estimated by subtracting the previously known weight of the container that comprises the goods from a second result obtained by dividing the second drive force by a fourth function comprising the second acceleration value, gravity, and the second pitch angle.

The first weight may be estimated by subtracting a total weight of one or more persons located in the autonomous vehicle from a first result obtained by dividing the first drive force by a third function comprising the first acceleration value, gravity, and the first pitch angle. The second weight may be estimated by subtracting the total weight of the one or more persons located in the autonomous vehicle from a second result obtained by dividing the second drive force by a fourth function comprising the second acceleration value, gravity, and the second pitch angle, and the total weight is determined using one or more weight values obtained from one or more weight sensors located in one or more seats of the autonomous vehicle.

The first drive force may be determined as the first function of the first torque value, a pre-defined transmission gear ratio, a pre-defined final drive ratio, a transmission efficiency, and a tire radius. The second drive force may be determined as the second function of the second torque value, the pre-defined transmission gear ratio, the pre-defined final drive ratio, the transmission efficiency, and the tire radius. The first drive force may be determined as a first function of at least the first torque value; the second drive force may be determined as a second function of at least the second torque value; the first weight may be estimated by subtracting a first weight of a fuel in the autonomous vehicle from a first result obtained by dividing the first drive force by a third function comprising the first acceleration value, gravity, and the first pitch angle; and the second weight may be estimated by subtracting a second weight of the fuel in the autonomous vehicle from a second result obtained by dividing the second drive force by a fourth function comprising the second acceleration value, gravity, and the second pitch angle.

The first weight and the second weight of the fuel may be determined by multiplying a previously known density of the fuel by a first volume of the fuel and the second volume, respectively, and the first volume and the second volume of the fuel are determined by a fuel gauge sensor. The first acceleration value, the second acceleration value, the first pitch angle, and the second pitch angle may be obtained from an inertial measurement unit (IMU), and the first pitch angle and the second pitch angle may describe angles by which the autonomous vehicle is pointing up or down relative to a horizon.

The method of FIG. 3 may further comprise sending the message to a remote computer located in a command center outside the autonomous vehicle in response to the determination that the difference between the first value and the second value is greater than the pre-determined value. The method of FIG. 3 may further comprise sending a second message to another computer located outside the autonomous vehicle and associated with a law enforcement agency, where the second message is sent in response to the determination that the difference between the first value and the second value is greater than the pre-determined value, where the second message indicates that theft is detected in the autonomous vehicle, and where the second message comprises a location of the autonomous vehicle and a license plate number of the autonomous vehicle.

The method of FIG. 3 may further comprise causing the autonomous vehicle to be brought to a stop or to be parked in response to the detection of the theft and in response to determining that the autonomous vehicle is driven on a road. The method of FIG. 3 may further comprise receiving, at a third time, a first set of weight values that indicate a weight of the goods; receiving, at a fourth time that is later in time than the third time, a second set of weight values that indicate the weight of the goods, wherein the first set of weight values and the second set of weight values are received from a set of weight sensors located in the autonomous vehicle; and displaying, on the interface associated with the computer, a second message that indicates that theft is detected in response to determining that a first value representative of the first set of weight values differs from a second value representative of the second set of weight values by the pre-determined value.

The first value may be an average of the first set of weight values, and the second value may be an average of the second set of weight values. A first time difference between the first time and the second time may be based on a first pre-determined time period, a second time difference between the third time and the fourth time may be based on a second pre-determined time period, and the first pre-determined time period may be greater than the second pre-determined time period. The first set of weight values and the second set of weight values may be received by polling the set of weight sensors upon receiving from a proximity sensor located in the rear region of the autonomous vehicle an indication that indicates a presence of an object in a rear region of the autonomous vehicle and upon determining that: (1) the speed of the autonomous vehicle is less than the pre-determined speed value, or (2) the autonomous vehicle is parked, or (3) the autonomous vehicle is stopped. The first set of weight values and the second set of weight values may be received by polling the set of weight sensors upon receiving from an inertial measurement unit (IMU) device located in the autonomous vehicle an indication that indicates that a jolt is detected and upon determining that: (1) the speed of the autonomous vehicle is less than the pre-determined speed value, or (2) the autonomous vehicle is parked, or (3) the autonomous vehicle is stopped. The speed of the autonomous vehicle may be determined to be less than the pre-determined speed value upon determining that the autonomous vehicle is parked or stopped.

In this document the term "exemplary" is used to mean "an example of" and, unless otherwise stated, does not imply an ideal or a preferred embodiment. In the patent document the term "semi-trailer truck" is used to describe features of the weight estimation or weight determination. However, the weight estimation or weight determination techniques described can be applied to other kinds of vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A processor implemented method, comprising:
   receiving, by a computer located in an autonomous vehicle and at a first time, a first torque value that indicates a first amount of torque applied by an engine of the autonomous vehicle to drive the autonomous vehicle;
   receiving, at a second time that is later in time than the first time, a second torque value that indicates a second amount of torque applied by the engine of the autonomous vehicle;
   determining that a difference between a first value and a second value is greater than a pre-determined value, wherein the first value is a function of at least the first torque value and the second value is a function of at least the second torque value;
   displaying, on an interface associated with the computer and in response to the determining, a message that indicates a detection of theft in the autonomous vehicle; and
   sending, to one or more devices in the autonomous vehicle, instructions that cause the autonomous vehicle to steer and stop in response to the detection of the theft and in response to determining that the autonomous vehicle is driven on a road.

2. The processor implemented method of claim 1, wherein the first value comprises a first weight of goods included in the autonomous vehicle, wherein the second value comprises a second weight of goods included in the autonomous vehicle, and wherein the first value and the second value are determined by:
   estimating the first weight of goods included in the autonomous vehicle based at least on a first drive force, a first acceleration value, and a first pitch angle of the autonomous vehicle; and
   estimating a second weight of goods included in the autonomous vehicle based at least on a second drive force, a second acceleration value, and a second pitch angle of the autonomous vehicle at the second time.

3. The processor implemented method of claim 2,
   wherein the first drive force is determined as a first function of at least the first torque value,
   wherein the second drive force is determined as a second function of at least the second torque value,
   wherein the first weight is estimated by subtracting a previously known weight of the autonomous vehicle without the goods from a first result obtained by dividing the first drive force by a third function comprising the first acceleration value, gravity, and the first pitch angle, and
   wherein the second weight is estimated by subtracting the previously known weight of the autonomous vehicle without the goods from a second result obtained by dividing the second drive force by a fourth function comprising the second acceleration value, gravity, and the second pitch angle.

4. The processor implemented method of claim 2,
   wherein the first drive force is determined as a first function of at least the first torque value,
   wherein the second drive force is determined as a second function of at least the second torque value,
   wherein the first weight is estimated by subtracting a previously known weight of a container that comprises the goods from a first result obtained by dividing the first drive force by a third function comprising the first acceleration value, gravity, and the first pitch angle, and
   wherein the second weight is estimated by subtracting the previously known weight of the container that comprises the goods from a second result obtained by dividing the second drive force by a fourth function comprising the second acceleration value, gravity, and the second pitch angle.

5. The processor implemented method of claim 2,
   wherein the first weight is estimated by subtracting a total weight of one or more persons located in the autonomous vehicle from a first result obtained by dividing the first drive force by a third function comprising the first acceleration value, gravity, and the first pitch angle,
   wherein the second weight is estimated by subtracting the total weight of the one or more persons located in the autonomous vehicle from a second result obtained by dividing the second drive force by a fourth function comprising the second acceleration value, gravity, and the second pitch angle, and
   wherein the total weight is determined using one or more weight values obtained from one or more weight sensors located in one or more seats of the autonomous vehicle.

6. The processor implemented method of claim 2,
   wherein the first drive force is determined as the first function of the first torque value, a pre-defined transmission gear ratio, a pre-defined final drive ratio, a transmission efficiency, and a tire radius, and
   wherein the second drive force is determined as the second function of the second torque value, the pre-defined transmission gear ratio, the pre-defined final drive ratio, the transmission efficiency, and the tire radius.

7. The processor implemented method of claim 2,
   wherein the first drive force is determined as a first function of at least the first torque value,
   wherein the second drive force is determined as a second function of at least the second torque value,
   wherein the first weight is estimated by subtracting a first weight of a fuel in the autonomous vehicle from a first result obtained by dividing the first drive force by a third function comprising the first acceleration value, gravity, and the first pitch angle, and
   wherein the second weight is estimated by subtracting a second weight of the fuel in the autonomous vehicle from a second result obtained by dividing the second drive force by a fourth function comprising the second acceleration value, gravity, and the second pitch angle.

8. The processor implemented method of claim 7,
   wherein the first weight and the second weight of the fuel are determined by multiplying a previously known density of the fuel by a first volume of the fuel and the second volume, respectively, and wherein the first volume and the second volume of the fuel are determined by a fuel gauge sensor.

9. The processor implemented method of claim 2,
wherein the first acceleration value, the second acceleration value, the first pitch angle, and the second pitch angle are obtained from an inertial measurement unit (IMU), and
wherein the first pitch angle and the second pitch angle describe angles by which the autonomous vehicle is pointing up or down relative to a horizon.

10. An apparatus for autonomous vehicle operation comprising a processor, configured to implement a method comprising:
receive, at a first time, a first torque value that indicates a first amount of torque applied by an engine of an autonomous vehicle to drive the autonomous vehicle;
receive, at a second time that is later in time than the first time, a second torque value that indicates a second amount of torque applied by the engine of the autonomous vehicle;
perform a determination that a difference between a first value and a second value is greater than a pre-determined value, wherein the first value is a function of at least the first torque value and the second value is a function of at least the second torque value;
display, on an interface and in response to the determination, a message that indicates a detection of theft in the autonomous vehicle; and
send, to one or more devices in the autonomous vehicle, instructions that cause the autonomous vehicle to steer and stop in response to the detection of the theft and in response to determining that the autonomous vehicle is driven on a road.

11. The apparatus of claim 10, wherein the pre-determined value comprises a pre-determined weight value or a pre-determined percentage of a weight of goods included in the autonomous vehicle.

12. The apparatus of claim 10, wherein the processor is further configured to:
send the message to a remote computer located in a command center outside the autonomous vehicle in response to the determination that the difference between the first value and the second value is greater than the pre-determined value.

13. The apparatus of claim 10, wherein the processor is further configured to:
send a second message to another computer located outside the autonomous vehicle and associated with a law enforcement agency,
wherein the second message is sent in response to the determination that the difference between the first value and the second value is greater than the pre-determined value,
wherein the second message indicates that theft is detected in the autonomous vehicle, and
wherein the second message comprises a location of the autonomous vehicle and a license plate number of the autonomous vehicle.

14. A non-transitory computer readable program storage medium having code stored thereon, the code, when executed by a processor, causing the processor to implement a method comprising:
receiving, by a computer located in an autonomous vehicle and at a first time, a first torque value that indicates a first amount of torque applied by an engine of the autonomous vehicle to drive the autonomous vehicle;
receiving, at a second time that is later in time than the first time, a second torque value that indicates a second amount of torque applied by the engine of the autonomous vehicle;
determining that a difference between a first value and a second value is greater than a pre-determined value, wherein the first value is a function of at least the first torque value and the second value is a function of at least the second torque value;
displaying, on an interface associated with the computer and in response to the determining, a message that indicates a detection of theft in the autonomous vehicle; and
sending, to one or more devices in the autonomous vehicle, instructions that cause the autonomous vehicle to steer and stop in response to the detection of the theft and in response to determining that the autonomous vehicle is driven on a road.

15. The non-transitory computer readable program storage medium of claim 14, wherein upon determining that a speed of the autonomous vehicle is less than a pre-determined speed value, the method further comprises:
receiving, at a third time, a first set of weight values that indicate a weight of goods;
receiving, at a fourth time that is later in time than the third time, a second set of weight values that indicate the weight of the goods, wherein the first set of weight values and the second set of weight values are received from a set of weight sensors located in the autonomous vehicle; and
displaying, on the interface associated with the computer, a second message that indicates that theft is detected in response to determining that a third value representative of the first set of weight values differs from a fourth value representative of the second set of weight values by the pre-determined value.

16. The non-transitory computer readable program storage medium of claim 15, wherein the third value is an average of the first set of weight values, and wherein the fourth value is an average of the second set of weight values.

17. The non-transitory computer readable program storage medium of claim 15,
wherein a first time difference between the first time and the second time is based on a first pre-determined time period,
wherein a second time difference between the third time and the fourth time is based on a second pre-determined time period, and
wherein the first pre-determined time period is greater than the second pre-determined time period.

18. The non-transitory computer readable program storage medium of claim 15,
wherein the first set of weight values and the second set of weight values are received by polling the set of weight sensors upon receiving from a proximity sensor located in a rear region of the autonomous vehicle an indication that indicates a presence of an object in the rear region of the autonomous vehicle and upon determining that:
(1) the speed of the autonomous vehicle is less than the pre-determined speed value, or
(2) the autonomous vehicle is parked, or
(3) the autonomous vehicle is stopped.

19. The non-transitory computer readable program storage medium of claim 15,
wherein the first set of weight values and the second set of weight values are received by polling the set of weight sensors upon receiving from an inertial measurement unit (IMU) device located in the autonomous vehicle an indication that indicates that a jolt is detected and upon determining that:
(1) the speed of the autonomous vehicle is less than the pre-determined speed value, or
(2) the autonomous vehicle is parked, or
(3) the autonomous vehicle is stopped.

\* \* \* \* \*